United States Patent [19]

Meurer et al.

[11] Patent Number: 4,812,546
[45] Date of Patent: Mar. 14, 1989

[54] NEW COPOLYMERS OF ALPHA-CYANOACRYLATES AND ACRYLATES, THEIR PREPARATION AND THEIR USE

[75] Inventors: Kurt P. Meurer, Koenigswinter; Helmut Waniczek, Cologne; Christian Ohm, Leverkusen; Josef Witte, Cologne, all of Fed. Rep. of Germany

[73] Assignee: Bayer Aktiengesellschaft, Leverkusen, Fed. Rep. of Germany

[21] Appl. No.: 101,075

[22] Filed: Sep. 25, 1987

[30] Foreign Application Priority Data

Oct. 3, 1986 [DE] Fed. Rep. of Germany ....... 3633711
Nov. 11, 1986 [DE] Fed. Rep. of Germany ....... 3638387

[51] Int. Cl.$^4$ .............................................. C08F 20/42
[52] U.S. Cl. ..................................... 526/297; 526/298
[58] Field of Search ............................... 526/297, 298

[56] References Cited

U.S. PATENT DOCUMENTS

| 2,437,231 | 3/1948 | Mowry | 526/298 |
| 2,974,788 | 6/1957 | Coover, Jr. et al. | 527/298 |
| 3,282,773 | 11/1966 | Wicker, Jr. et al. | 526/298 |
| 3,652,635 | 3/1972 | Kawanura et al. | 526/297 |
| 3,654,239 | 4/1972 | McIntire et al. | 526/297 |
| 3,697,490 | 10/1972 | Starmer | 526/297 |
| 3,701,758 | 10/1972 | Maska | 526/298 |
| 3,940,362 | 2/1976 | Overhults | 526/298 |

FOREIGN PATENT DOCUMENTS

| 813984 | 5/1969 | Canada | 526/298 |
| 0160399 | 11/1985 | European Pat. Off. | 526/297 |
| 56-95968 | 8/1981 | Japan | 526/298 |

Primary Examiner—Joseph L. Schofer
Assistant Examiner—N. Sarofim
Attorney, Agent, or Firm—Connolly & Hutz

[57] ABSTRACT

This invention relates to copolymers of α-cyanoacrylates and acrylates, their preparation and their use.

10 Claims, No Drawings

NEW COPOLYMERS OF ALPHA-CYANOACRYLATES AND ACRYLATES, THEIR PREPARATION AND THEIR USE

This invention relates to copolymers of α-cyanoacrylates and acrylates, their preparation and their use.

The copolymers are obtained by the copolymerisation of α-cyanoacrylates preferably corresponding to Formula (I)

$$CH_2=C(CN)-COOR^1$$

wherein
R$^1$ stands for $C_1$–$C_8$ alkyl or denotes $C_1$–$C_8$-alkyl and may be substituted with a group corresponding to Formula (III)

$$-(R^4O)_n-R^5$$

wherein
R$^4$ stands for $C_1$–$C_8$-alkylene,
R$^5$ stands for hydrogen or a $C_1$–$C_8$-alkylene and
n stands for an integer with a value from 1 to 10, preferably an integer with a value from 1 to 4,
with acrylates preferably corresponding to Formula (II)

$$H_2C=C(R^2)-COOR^3$$

wherein
R$^2$ denotes hydrogen or $C_1$–$C_6$ alkyl and
R$^3$ denotes $C_1$–$C_8$ alkyl
which may be substituted with a group corresponding to Formula (III)

$$-(R^4O)_n-R^5$$

wherein
R$^4$ stands for $C_1$–$C_8$ alkylene,
R$^5$ stands for hydrogen or a $C_1$–$C_8$ alkyl and
n stands for an integer with a value from 1 to 10, preferably an integer with a value from 1 to 4.

Methyl, ethyl, propyl, i-propyl, butyl, i-butyl, pentyl, i-pentyl, i-hexyl and hexyl and examples of alkyl groups R$^1$, R$^2$, R$^3$ and R$^5$.

The alkylene groups R$^4$ may be, for example, methylene, ethylene, propylene, i-propylene, butylene, pentylene, i-pentylene, hexylene and i-hexylene.

The copolymers include those of α-cyanoacrylates corresponding to Formula (I) and acrylates corresponding to Formula (II).

The following copolymers of α-cyanoacrylate of Formula (I) and acrylate of Formula (II) are given as examples:

$$CH_2=C(CN)-COOCH_3 + CH_2=C(H)-COOC_4H_9 \quad (a)$$

$$CH_2=C(CN)-COOCH_3 + CH_2=C(H)-COOCH_2CH_2OC_2H_5 \quad (b)$$

$$CH_2=C(H)-COOCH_2CH_2OCH_3 + \quad (c)$$

$$CH_2=C(CN)-CO_2CH_2CH_2CH(OCH_3)(CH_3)$$

and
terpolymers obtained from the above mentioned monomers, e.g. from (d)

$$CH_2=C(CN)-COOCH_3 + CH_2=C(H)-COOC_4H_9 +$$

$$CH_2=C(H)-COOCH_2CH_2OC_2H_5$$

The compounds used as α-cyanoacrylates of Formula (I) are preferably the methyl ester, ethyl ester or butyl ester of α-cyanoacrylic acid.

The following are preferably used as acrylates of Formula (II): methyl acrylate, ethyl acrylate, butyl acrylate, ethoxyethyl acrylate, methoxyethyl acrylate, methoxypropyl acrylate and methoxybutyl acrylate.

From 2.5 to 100 mol of acrylate of Formula (II) are used per mol of α-cyanoacrylate of Formula (I).

Preferably, this invention further relates to a process for the preparation of the copolymer of α-cyanoacrylates of Formula (I) and acrylates of Formula (II).

Copolymerisation is carried out as a continuous or batchwise radical polymerisation in an aprotic solvent under an inert gas (e.g. N$_2$, argon, etc.) at a temperature of 50° to 120° C.

The starters used for this radical polymerisation may be conventional initiators such as azo initiators or peroxide initiators used in the usual quantities, e.g. azo-bis-isobutyronitrile, t-butylperpivalate, t-amylperpivalate, t-butyl-per-2-ethylhexanoate, benzoylperoxide, t-butylperbenzoate, bis-(4-t-butyl-cyclohexyl)-peroxidicarbonate, di-tert.-butylperoxide, di-cumylperoxide, di-cyclohexyl-peroxidicarbonate or dilaurylperoxide.

Suitable aprotic solvents include, for example, aromatic hydrocarbons, especially toluene, o-xylene, m-xylene, p-xylene, and benzene, halogenated aromatic hydrocarbons such as chlorobenzene or o-dichlorobenzene and ketones such as acetone or methylethylketone.

The preparation of acrylate resins and acrylate lacquers by solvent polymerisation is known. A process for the preparation of acrylate rubbers (acrylate elastomers) from acrylate copolymers which have high molecular weights and relatively high molecular uniformities $$\left( U_n = \frac{M_w}{M_n} - 1 = 1.0-10.0 \right),$$

by solution polymerisation has not hitherto been described. DE-OS No. 2,040,626 mentions solution polymerisation only as an alternative to the preparation of acrylate elastomers.

The preparation of acrylate rubber by emulsion polymerisation is generally carried out in the aqueous phase. High molecular weights can be obtained by this process but owing to the anionic polymerisation of α-cyanoacrylates (see H. Lee, "Cyanoacrylate Resins—The Instant Adhesives, Chapt. 9, page 56 (1981) which occurs spontaneously in the presence of water, an acrylate rubber containing an α-cyanoacrylic acid ester as comonomer cannot be synthesized by emulsion polymerisation.

Ethylidene norbornene and (meth)acrylic acid ester containing a second unsaturated ethylenic group, e.g. an allyl methacrylate, or an ethylenically unsaturated compound containing epoxy groups, such as glycidyl methacrylate, may be added as additional comonomer. This comonomer is added before or during polymerisation, in quantities of 0.5 to 10% by weight, based on the total monomer.

The incorporation of this comonomer serves to introduce unsaturated or reactive groups into the polymer. These groups improve the capacity for cross linking (vulcanization) of the copolymers according to the invention.

The polymerisation reaction is started by a single addition or successive additions of initiator. The initiators used are radical formers such as those mentioned above.

The polymerisation is preferably carried out at a temperature of 60° to 100° C. At the end of polymerisation, the viscous solution obtained is slowly introduced into hot water which may contain a dispersing auxiliary such as orothan ® (=the sodium salt of polydiisobutene co-maleic acid anhydride) and the solvent is distilled off.

The wet polymer is filtered off and dried in a vacuum. Colourless to pale yellow polymers are obtained in yields amounting to 75 to 95% of the theoretical yields.

The copolymers obtained have molecular weights ($M_w$) of from 20,000 to 1,000,000, preferably from 100,000 to 500,000, and nonuniformities of $$U_n = \left( \frac{M_w}{M_n} - 1 \right) = 1,0\text{--}10.$$

The copolymers may be vulcanized in the usual manner, e.g. by means of peroxide or by means of sulphur accelerator systems. The second vulcanization (15 hours) which is usual for acrylate rubbers may be carried out at about 150° to 170° C. (e.g. 165° C.) in hot air.

Vulcanizing agents based on hexamethylene diaminocarbamate and potassium, sodium or ammonium salts of benzoic acids and higher fatty acids (e.g. stearates) may also be used.

The vulcanizates of the copolymers are distinguished by their improved resistance to oil combined with good flexibility at low temperatures.

The copolymers are further distinguished by their stability in the heat and resistance to oxidizing agents such as ozone, peroxides, etc. They are also highly resistant to oils such as machine oils of the kind used in motor vehicles. They may be used, for example, for the manufacture of sealing material, cables and hoses and pipes.

The copolymers may be mixed with the usual additives such as fillers (which may or may not be reinforcing) plastisizers, stabilizers, dyes, processing auxiliaries and age resistors, e.g. sterically hindered phenols, arylamines, organic phosphites and vulcanizing agents.

EXAMPLE 1

76 ml (84.1 g, 747.2 mmol) of chlorobenzene are introduced at room temperature under nitrogen into a 250 ml three necked flask which has previously been heated to 200° C. and is equipped with stirrer, reaction temperature thermometer and inert gas inlet, and the chlorobenzene is stirred in the flask, 3.9 mmol (0,59 g) of butyl cyanoacrylate, 243.5 mmol (31.2 g) of butyl acrylate and 18.8 mg of azo-bis-isobutyronitrile are added. The temperature is raised to 60° C. with constant stirring and the reaction mixture is left to polymerize for 8 hours under inert gas. Steam distillation is then carried out and a colourless rubber having a molecular weight $M_w$ of 450,000 g/mol (GPC) is obtained in 90% yield. The viscosity number ($\eta$) is ($\eta$)$_{dichloromethane}$=129 cm$^3 \cdot$g$^{-1}$, THF, 25° C., Tg=−50 (DSC).

EXAMPLE 2

The procedure is the same as described in Example 1. 225 mmol (32.06 ml, 28.8 g) of butyl acrylate and 25 mmol (2.77 g) (2.5 ml) of α-methylcyanoacrylate are used. A colourless rubber having a molecular weight of $M_w$=498,000 g/ml (GPC) is obtained in 92% yield. The viscosity number ($\eta$) is 135 cm$^3 \cdot$g$^{-1}$ (dichloromethane). Tg (DSC)=−49° C.

EXAMPLE 3

33 g (30 ml, 293.1 mmol) of chlorobenzene, 11.1 g (12.4 ml), 86.6 mmol) of n-butyl acrylate, 3.45 g (3.1 ml, 31.05 mmol) of methylcyanoacrylate, 0.45 g (0.5 ml, 3.74 mmol) of ethylidene norbornene and 37.6 mg (0.21 mmol) of tert.-butyl perpivalate are introduced at room temperature under nitrogen into a 250 ml three necked flask which is equipped with stirrer, internal thermometer and inert gas inlet and has been heated to 200° C. The temperature is raised to 70° C. with constant stirring and the reaction mixture is left to polymerize for 18 hours. A colourless rubber having a molecular weight of $M_w$=400,000 g/mol and $U_n$=5.1 is obtained in 85% yield after steam distillation. ($\eta$)$_{dichloromethane}$= 137 cm$^3 \cdot$g$^{-1}$ (25° C.), Tg=−46° C.

EXAMPLE 4

Three liters of predried chlorobenzene are introduced at room temperature into a 12 liter autoclave equipped with stirrer, reaction temperature control and inert gas inlet. 123 ml (117 g, 679.4 mmol) of butoxyethyl acrylate, 859 ml (845 g, 5861 mmol) of ethoxyethyl acrylate and 34.2 ml (37.8 g, 340 mmol) of α-cyanoacrylic acid methyl ester are then pumped in at room temperature. 0.6 g (3.65 mmol) of azo-bis-isobutyronitrile are finally added and the inert gas pressure in the autoclave is raised to 5 bar. The reaction temperature is then raised to 70° C., starting from room temperature. The polymerization time is 10 hours. The clear, highly viscous solution mixture is discharged after this polymerization time and the polymer is precipitated in hot water containing 1.5% of calcium chloride and orothan. The polymer is dried in a vacuum at 60° C. for 24 hours. A colourless rubber having a molecular weight of $M_w$=320,000 g/mol, Mn=60,000 g/mol and $U_n$=4.3 is obtained in 90% yield. ($\eta$)$_{dimethyl\ acetamide}$=162 cm$^3 \cdot$g$^{-1}$ (at 75° C.), ($\eta$)$_{dichloromethane}$=141 cm$^3 \cdot$g$^{-1}$ (at 25° C.), Tg=−48° C.

EXAMPLE 5

Five liters of predried chlorobenzene are introduced at room temperature into a 12 liter autoclave equipped with stirrer, reaction temperature control and inert gas inlet. 2,410 ml (2,165 g; 16.9 mol) of butyl acrylate and 340 ml (375 g, 3.4 mol) of α-cyano-acrylic acid methyl ester are then pumped in at room temperature. 4.68 g (26.9 mmol) of t-butylperpivalate are finally added and the inert gas pressure in the autoclave is raised to 5 bar. The reaction temperature is then raised from room temperature to 70° C. The polymerization time is 18 hours. The clear, highly viscous solution mixture obtained at the end of this time is discharged and the polymer is precipitated in hot water containing 1.5% of calcium chloride and orothan. The polymers are dried in a vacuum at 60° C. for 24 hours. A colourless rubber having a molecular weight of $M_w$=540,000 g/mol, $M_n$=65,0001 g/mol, $U_n$=4 is obtained in 85% yield; $T_g$=−47° C.; $(\eta)_{dichloromethane}$=145 cm$^3$·g$^{-1}$ (at 25° C.).

EXAMPLE 6

Three liters of predried chlorobenzene are introduced at room temperature into a 12 liter autoclave equipped with stirrer, reaction temperature control and inert gas inlet. 1,375 ml (1,350 g; 8.53 mol) of methoxybutyl acrylate and 135.8 ml (150 g; 1.35 mol) of the methyl ester of α-cyano-acrylic acid are then pumped in at room temperature under an inert gas (N$_2$). 1.88 g (10.8 mmol) of t-butylperpivalate are finally added.

The reaction temperature is then raised from room temperature to 70° C. within 20 minutes. The polymerization time is 18 hours. A clear, highly viscous polymer solution is obtained after cooling. The polymer is precipitated in hot water containing 50 ppm of the sodium salt of poly(diisobutene-co-maleic acid anhydride). The polymer is dried under vacuum at 60° C. for 24 hours. A 75 to 80% yield of product is obtained. $T_g$=−45° C., $(\eta)_{dichloromethane}$=170 cm$^3$·g$^{-1}$ (at 25° C.).

EXAMPLE 7

Three liters of predried chlorobenzene are introduced at room temperature into a 12-liter autoclave equipped with stirrer, reaction temperature control and inert gas inlet. 1,350 ml (1,350 g; 9.375 mol) of methoxypropyl acrylate and 135.8 ml (150 g; 1.35 mol) of the methyl ester of cyano-acrylic acid are then pumped in at room temperature. 1.88 g (1018 mmol) of t-butylperpivalate are finally added. The reaction temperature is then raised from room temperature to 70° C. The polymerisation time is 18 hours. The clear, highly viscous mixture is discharged after cooling and the polymer is precipitated in hot water containing 50 ppm of the sodium salt of poly(diisobutylene-co-maleic acid). The yield obtained is 75 to 80%. $T_g$=−21° C., $(\eta)_{dichloromethane}$=150 cm$^3$·g$^{-1}$ (at 25° C.), $U_n$=5, $M_w$=500,000 g·mol$^{-1}$ and $M_n$=60,000 g/mol.

We claim:

1. Copolymers obtained by the copolymerization of α-cyanoacrylates corresponding to formula (I)

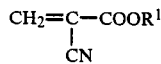

wherein

R$^1$ stands for C$_1$–C$_8$ alkyl which may be preferably substituted with a group corresponding to formula (III)

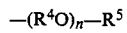

wherein

R$^4$ stands for C$_1$–C$_8$-alkylene,
R$^5$ stands for hydrogen or a C$_1$–C$_8$-alkyl and
n stands for an integer with a value from 1 to 10, preferably an integer with a value from 1 to 4, with acrylates corresponding to Formula (II)

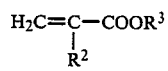

wherein

R$^2$ denotes hydrogen or C$_1$–C$_6$ alkyl and
R$^3$ denotes C$_1$–C$_8$ alkyl which may be preferably substituted with a group corresponding to Formula (III)

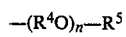

wherein

R$^4$ stands for C$_1$–C$_8$ alkylene,
R$^5$ stands for hydrogen or a C$_1$–C$_8$ alkyl and
n stands for an integer with a value from 1 to 10, preferably an integer with a value from 1 to 4.

2. Copolymers according to claim 1 containing 2.5 to 100 mol of acrylate of formula (II) per mol of α-cyanacrylate of formula (I).

3. Copolymers according to claim 1 containing an additional comonomer with reactive or unsaturated groups e.g. ethylidene norbornene or (meth)acrylic acid esters containing a second unsaturated ethylenic group, e.g. an allyl methacrylate, or an ethylenically unsaturated compound containing epoxy groups, such as glycidyl methacrylate.

4. Copolymers according to claim 1 containing an additional comonomer according to claim 3 containing the above mentioned comonomer in quantities of 0.5 to 10% by weight based on the total monomer.

5. Process for the preparation of copolymers according to claim 1, characterized in that α-cyanoacrylates corresponding to formula (I) and acrylates corresponding to formula (II) are copolymerized in aprotic solvents by using radical initiators.

6. Process for the preparation of copolymers according to claim 1, characterized in that radical initiators are used like peroxides, peresters or azocompounds preferably azobisisobutyronitril or tert.alkylperpivalates especially preferred tert.-butylperpivalat.

7. Vulcanisates of the copolymers according to claim 1.

8. A process in accordance with claim 5, further comprising an additional comonomer with reactive or unsaturated groups e.g., ethylidene norbornene or (Meth)acrylic acid esters, containing a second unsaturated ethylenic group, e.g. an allyl methacrylate, or an ethylenically unsaturated compound containing epoxy groups, such as glycidyl methacrylate.

9. A process in accordance with claim 8 wherein the additional comonomer is present in amount of 0.5 to 10%, by weight, based on the total monomer.

10. A thermoplastic elastomer of rubber material comprising copolymers with accordance to claim 1.

* * * * *